Patented Feb. 6, 1951

2,540,580

UNITED STATES PATENT OFFICE 2,540,580

QUALITY OF OLEFIN POLYMER LUBRICANTS

Raymond L. Heinrich, Baytown, Tex., assignor, by mesne assignments, to Standard Oil Development Company, Elizabeth, N. J., a corporation of Delaware No Drawing. Application September 11, 1947, Serial No. 773,501

6 Claims. (Cl. 260—683.15)

The present invention relates to a process for making lubricating oils and more particularly relates to the preparation of lubricating oils of improved stability characteristics from olefins.

It has heretofore been proposed to prepare lubricating oils from olefins by polymerizing alpha olefins in the presence of a halide catalyst and subsequently reacting the olefin polymers obtained thereby with various materials to improve the stability of the polymer oil. For example, it is known that lubricating oils prepared by polymerizing olefins may be stabilized and otherwise improved by reacting these olefin polymers with such materials as sulfur and compounds of sulfur or phosphorus and compounds of phosphorus. Material prepared by such processes are known to have materially better stability characteristics and to possess improved oiliness and extreme pressure characteristics. Such materials may themselves be used as lubricating oils but it is also known to blend such materials with petroleum lubricant fractions to improve the oxidation, oiliness, and extreme pressure characteristics of such fractions.

One of the objects of this invention is to prepare a lubricating oil from alpha olefins which has improved stability to oxidation. Another object is to reduce the tendency of lubricating oils prepared by the polymerization of alpha olefins to further polymerize during use. Other objects will be apparent from the following detailed description of my invention.

In accordance with my invention, alpha olefins, preferably those boiling below 450° F. at atmospheric pressure, are polymerized in the presence of a Friedel-Crafts type catalyst, for instance, preferably aluminum chloride, and are simultaneously reacted with an element or a compound of an element appearing in the right-hand columns of groups V and VI of Mendeleeff's periodic arrangement of the elements, the said elements being nitrogen, phosphorus, arsenic, antimony, bismuth, oxygen, sulfur, selenium, tellurium, and polonium. Of the elements appearing in the above-mentioned groupings and compounds of such elements, phosphorus and phosphorus pentasulfide are the preferred materials used although it is understood that any of the others may be used. The reaction is carried out under such conditions of time, temperature, pressure, and dilution as will result in securing a product which is of such molecular weight and physical characteristics as to make it suitable for use as a lubricant. These conditions will, of course, vary with the olefin employed, the catalyst used to catalyze the polymerization reaction, and the particular material which is selected from the right hand column of group V or VI. In carrying out this invention, I prefer to use substantially anhydrous aluminum chloride although any of the Friedel-Crafts catalysts may be used, such, for example, as boron fluoride, zinc chloride, aluminum bromide, etc. When boron fluoride is employed, the temperature at which the reaction is conducted will ordinarily be lower than when aluminum chloride is used. Furthermore, various reaction pressures may be maintained. When, for example, butene-1 or propane is used in combination with boron fluoride, it will be necessary to operate at pressures in excess of atmospheric but I prefer to operate at atmospheric pressure whenever possible. In my process, a diluent may be used to give greater control over the polymerization reaction though the use of such diluent is not necessary. When a diluent is used, I prefer to use a relatively low boiling straight chain paraffinic hydrocarbon since it is preferable to avoid the use of branched chain paraffinic hydrocarbons as such hydrocarbons tend to react with the olefins present under the influence of the catalyst employed thereby causing undesirable side reactions.

The reaction temperature maintained in practicing the process of my invention will be determined by the particular alpha olefin to be polymerized, the element or compound thereof chosen, the catalyst employed and in some instances by the pressure at which the reaction is conducted. However, the reaction should ordinarily be carried out at a temperature of not less than 50° F. and not in excess of about 250° F. since the desired product cannot ordinarily be secured if the reaction temperature is maintained outside these limits.

Sufficient time should be allowed for the substantial completion of the reaction and the time required may vary from a few minutes to several hours depending upon the reaction materials which are employed and the reaction conditions maintained. I have found that ordinarily the reaction should be permitted to continue for at least 30 minutes and ordinarily should not be permitted to exceed 3 or 4 hours. The reaction mixture is, of course, agitated while the reaction is in progress.

On completion of the reaction, agitation is discontinued and a sludge separates from the reaction mixture. The sludge is withdrawn and the oily liquid remaining in the reactor contains the desired lubricant. It is desirable to quench any catalyst which may be suspended or dissolved in this oily liquid and after such quenching the lubricant contained therein may be recovered. The recovery of the desired lubricant may be accomplished by any of the well-known means such, for example, as atmospheric, vacuum or steam distillation or steam stripping. By this means, the desired lubricant boiling within a selected boiling range may be recovered. Of course, the recovered lubricant may be subjected to additional treatment such, for example, as clay filtration, but such additional treatment is no part of this invention and it will often be found that no additional treatment is required.

As an example of my invention, pentene-1 was reacted with red phosphorus in the presence of substantially anhydrous aluminum chloride for 2 hours at 95° F. and at atmospheric pressures. The following materials were charged to the reactor in amounts indicated as parts by weight: aluminum chloride, 0.4 part; red phosphorus 1.0 part, pentene-1, 50 parts; and normal pentane, 50 parts.

was realized in the distillation operation and the overhead vapor consisted of 10 parts of water and 1 part hydrocarbon.

The lubricating oil bottoms obtained in each of the five above-mentioned experiments were tested. In addition, a sample of each of these five lubricating oil bottoms was subjected to oxidation and the product from this oxidation was tested. The conditions under which each of these five experiments was conducted together with the physical analysis of the lubricating oil bottoms obtained and the analysis of the samples of the bottoms subjected to oxidation are shown in the tabulation below.

| Run No. | 1 | 2 | 3 | 4 | 5 |
|---|---|---|---|---|---|
| Material Added | Red Phosphorus | $P_2S_5$ | None | $P_2S_5$ | None. |
| Olefin | Pentene-1 | Pentene-1 | Pentene-1 | Dodecene-1 | Dodecene-1. |
| Diluent | n-Pentane | n-Pentane | n-Pentane | n-Pentane | n-Pentane. |
| Composition of Charges, Parts by Wt.: | | | | | |
| Material Added | 1.0 | 0.7 | None | 0.9 | None. |
| $AlCl_3$ Catalyst | 0.4 | 0.7 | 0.6 | 1.1 | 1.1. |
| Olefin | 50 | 52 | 51 | 55 | 55. |
| Diluent | 50 | 48 | 49 | 45 | 45. |
| Polymer Yield, Wt. Percent of Olefin Charged | 77 | 94 | 94 | 81 | 100. |
| Tests on Polymer: | | | | | |
| Before Oxidation*— | | | | | |
| V. I. | 92 | 93 | 93 | 130 | 130. |
| Vis., 210° F. | 133.9 | 128.5 | 143.8 | 106.1 | 105.4. |
| Neut. Value | 0.05 | 0.05 | 6.04 | 0.05 | 0.08. |
| Ramsbottom Coke** | 0.03 | 0.06 | 0.08 | 0.05 | 0.10. |
| After Oxidation:* | | | | | |
| Vis., 210° F. | 199 | 162 | 231 | 140.1 | 161.3. |
| Neut. Value | 2.38 | 1.41 | 3.72 | 0.63 | 4.20. |
| Ramsbottom Coke** | 0.14 | 0.20 | 0.19 | 0.37 | 0.24. |
| Percent Increase in Vis. 210° F. on Oxidation | 48 | 26 | 61 | 32 | 54 |
| Reaction Temp., °F. | 95 | 95 | 100 | 100 | 100. |
| Time, Hours | 2 | 1½ | 1 | 1¼ | 1¼. |
| Pressure | Atmos. | Atmos. | Atmos. | Atmos. | Atmos. |

*The method for conducting the oxidation is found in the 7th edition (1946) of "Standard Methods for Testing Petroleum and Its Products," published by Institute of Petroleum, Manson House, London, page 266. Test designation I. P. 48/44.

**The procedure for conducting this test is identified as I. P. 14/45 and is found on page 62 of the reference under * above.

In another example of my invention, 52 parts of pentene-1 was reacted with 0.7 part of phosphorus pentasulfide and 0.7 part of aluminum chloride in the presence of 48 parts of normal pentane. This reaction was conducted for 1½ hours at a temperature of 95° F. and at atmospheric pressure.

In a still further example of my invention, 55 parts of dodecene-1 was reacted with 0.9 part of phosphorus pentasulfide and 1.1 parts of aluminum chloride in the presence of 45 parts of normal pentane for 1¼ hours at a temperature of 100° F. and at atmospheric pressure.

For purpose of comparison, 51 parts of pentene-1 was reacted with 0.6 part of aluminum chloride in the presence of 49 parts of normal pentane with no additional materials added. The reaction time in this case was one hour and the temperature and pressure was 100° F. and atmospheric, respectively. Also for comparison, 55 parts of dodecene-1 was reacted with 1.1 parts of aluminum chloride and 45 parts of normal pentane with no additional material added. This latter reaction, which was conducted at 100° F. and at atmospheric pressure, was concluded in 1¾ hours.

Upon expiration of the above mentioned reaction periods in each example, the reaction mixture was allowed to stand for a sufficient time to separate the aluminum chloride sludge from the reactor hydrocarbon. The reactor hydrocarbon was then water washed in the absence of aluminum chloride sludge to destroy catalyst dissolved in the polymer. The polymer was then steam distilled until a bottoms temperature of 400° F.

It will be noted from the data that the lubricating oil treated with red phosphorus and a lubricating oil treated with phosphorus pentasulfide in accordance with this invention were considerably more stable to oxidation and to viscosity increase on vigorous oxidation than was the lubricating oil prepared in the conventional manner.

It is apparent from the foregoing tabulation that I have prepared a lubricant from alpha olefins capable of withstanding oxidation and polymerization. Although specific elements and compounds of elements appearing in the right-hand columns of groups V and VI have been employed in the examples hereinbefore mentioned and specific reaction conditions have been employed therein, it will be understood that various changes may be made in the materials employed and in the time, temperature, pressure and reaction period without departing from the scope of the invention. While only pentene-1 and dodecene have been employed in the examples hereinbefore mentioned, it will be understood that propene, butene-1, hexene-1, heptene-1, octene-1, nonene-1, decene-1, undecene-1, or tridecene-1 may be employed in the process of my invention.

What I wish to claim is:

1. A method of producing an improved lubricating oil which includes the steps of contacting a mixture of an alpha olefin having a boiling point of less than 450° F. and a material selected from the group consisting of phosphorus and phosphorus pentasulfide with a Friedel-Crafts type catalyst in the presence of a diluent at a temperature in the range between 50° and 250° F.

in the liquid phase for a time in the range between 1 and 3 hours sufficient for the simultaneous polymerization of the said olefin and for the reaction of the said olefin and its polymers with the said material to form a product suitable for use as a lubricating oil and recovering said product.

2. A method in accordance with claim 1 in which the Friedel-Crafts type catalyst is substantially anhydrous aluminum chloride.

3. A method in accordance with claim 1 in which the material is phosphorus pentasulfide.

4. A method in accordance with claim 1 in which the diluent employed is a low boiling, straight chain paraffinic hydrocarbon.

5. A method in accordance with claim 1 in which the material is phosphorus.

6. A method of producing an improved lubricating oil which includes the steps of contacting a mixture of alpha olefins having a boiling point of less than 450° F. and a material selected from the group consisting of phosphorus and phosphorus pentasulfide with a Friedel-Crafts type catalyst at a temperature in the range between 50° F. and 250° F. in the liquid phase for a time in the range between 1 and 3 hours sufficient for the simultaneous polymerization of said olefins and for the reaction of said olefins and their polymers with the said material to form a product suitable for use as a lubricating oil and recovering said product.

RAYMOND L. HEINRICH.

REFERENCES CITED

The following references are of record in the file of this patent:

UNITED STATES PATENTS

| Number | Name | Date |
|---|---|---|
| 2,082,518 | Ruthruff | June 1, 1937 |
| 2,316,080 | Loane et al. | Apr. 6, 1943 |
| 2,360,699 | McAllister et al. | Oct. 17, 1944 |
| 2,381,907 | Hughes et al. | Aug. 14, 1945 |
| 2,389,240 | Reid | Nov. 20, 1945 |
| 2,449,934 | Giammaria | Sept. 21, 1948 |

FOREIGN PATENTS

| Number | Country | Date |
|---|---|---|
| 453,854 | Great Britain | Sept. 18, 1936 |